United States Patent [19]

Goizueta et al.

[11] Patent Number: 5,042,640
[45] Date of Patent: Aug. 27, 1991

[54] GRIPPING AND CONVEYING APPARATUS

[75] Inventors: Miguel C. Goizueta, Hialeah; Scott E. Ellis, Miami Beach, both of Fla.

[73] Assignee: IDAB Incorporated, Hialeah, Fla.

[21] Appl. No.: 363,966

[22] Filed: Jun. 9, 1989

[51] Int. Cl.⁵ .............................................. B65G 47/04
[52] U.S. Cl. .................................. 198/468.8; 294/104; 198/468.5
[58] Field of Search .......................... 198/468.5, 468.8; 294/88, 104; 901/49

[56] References Cited

U.S. PATENT DOCUMENTS

| 2,894,363 | 7/1959 | Voogd . | |
|---|---|---|---|
| 3,491,900 | 1/1970 | Pinnolis et al. . | |
| 3,529,328 | 9/1970 | Davidson . | |
| 3,792,511 | 2/1974 | Evans . | |
| 4,667,998 | 5/1987 | Borcea . | |
| 4,673,329 | 6/1987 | Kato | 901/49 X |
| 4,708,236 | 11/1987 | Shiraishi | 198/468.8 X |
| 4,786,769 | 11/1988 | Knasel et al. | 901/49 X |
| 4,795,957 | 1/1989 | MacNeal, Jr. et al. | 901/49 X |
| 4,830,174 | 5/1989 | Davidsson | 294/104 X |

FOREIGN PATENT DOCUMENTS

| 4255837 | 3/1981 | Fed. Rep. of Germany . |
|---|---|---|
| 3516853 | 11/1985 | Fed. Rep. of Germany . |
| 8702922 | 4/1987 | Fed. Rep. of Germany . |
| 3948551 | 4/1976 | Switzerland . |
| 4320894 | 3/1982 | Switzerland . |
| 4333559 | 6/1982 | Switzerland . |
| 4381056 | 4/1983 | Switzerland . |
| 4666143 | 5/1987 | Switzerland . |
| 931490 | 7/1963 | United Kingdom . |
| 1151312 | 5/1969 | United Kingdom . |

Primary Examiner—D. Glenn Dayoan
Attorney, Agent, or Firm—Finnegan, Henderson, Farabow, Garrett & Dunner

[57] ABSTRACT

A gripping and conveying apparatus includes at least one gripper having jaws which are supported in an orientation where the jaws are attracted together by gravity. Magnets are mounted in the opposing surfaces of the jaws to hold the jaws together and grip the articles to be conveyed. The grippers are mounted on a breakaway arm mechanism. Cams and cam followers are used to separate the jaws at selected locations.

10 Claims, 9 Drawing Sheets

GRIPPING AND CONVEYING APPARATUS

BACKGROUND OF THE INVENTION

1. Field of the Invention

The present invention relates to an apparatus for gripping articles, and more particularly to an apparatus for selectively gripping and conveying articles.

2. Description of the Related Art

Conventional devices for gripping and conveying articles employ clamps with jaws which are held closed by mechanical actuators such as springs.

Conventional springs exert a force which is directly proportional to their displacement. Such a force is typically expressed by the equation $F=kx$, where $x$ is the distance the spring is displaced, $F$ is the force exerted at such displacement, and $k$ is a constant, sometimes referred to as the spring constant. Due to this relationship, a spring which holds the jaws of a gripper in a closed position exerts a force which increases as the jaws are opened and which decreases as the jaws are closed. As a result, the force exerted while the jaws are in a closed position, gripping an article, is always less than the force exerted when the jaws are open or maintained in an open position for allowing an article to be inserted. This force to displacement relationship has the drawback of causing the gripper to exert its minimal force during gripping when a maximal force is desirable, and its maximal force when open, when a minimal force is desirable.

Gripper conveyors are used in repetitive high speed operations, such as in the mailroom of a newspaper printing plant. The springs in such gripper conveyors are highly subject to wear and mechanical fatigue which results in failures or improper performance. Maintaining and replacing such springs is costly and can result in devastating down-time for the entire gripping and conveying apparatus while the gripper conveyor is under maintenance or repair.

It is an object of the present invention to provide a simple and reliable gripper conveyor which will minimize maintenance, will not be subject to mechanical fatigue or failure, and will minimize the overall cost and down-time of the apparatus.

It is also an object to provide a gripper having a maximal force when gripping and a minimal force when open.

It is a further object to provide a gripper having a predictable closing force which will remain constant over the life of the gripper.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, there is provided an apparatus for selectively gripping and conveying articles comprising at least one gripper including jaws having opposing surfaces for engaging an article, means for selectively separating the jaws, means for magnetically holding the jaws together to grip an article between the opposing surfaces, and means for supporting and conveying the jaws and articles gripped between the opposing surfaces of the jaws.

It is preferable that the supporting means supports the jaws in an orientation where the jaws are attracted together by gravity.

It is also preferable that the jaws include cam follower means, the separating means includes cam means at selected locations, and the conveying means conveys the jaws relative to the cam means to separate the jaws by engaging the cam follower means with the cam means at the selected locations.

BRIEF DESCRIPTION OF THE DRAWINGS

The accompanying drawings, which are incorporated in and constitute a part of the specification, illustrate preferred embodiments of the invention and, together with the general description given above and the detailed description of the preferred embodiments given below, serve to explain the principles of the invention.

DESCRIPTION OF THE PREFERRED EMBODIMENTS

Reference will now be made in detail to the present preferred embodiments of the invention as illustrated in the accompanying drawings.

Figure 1:
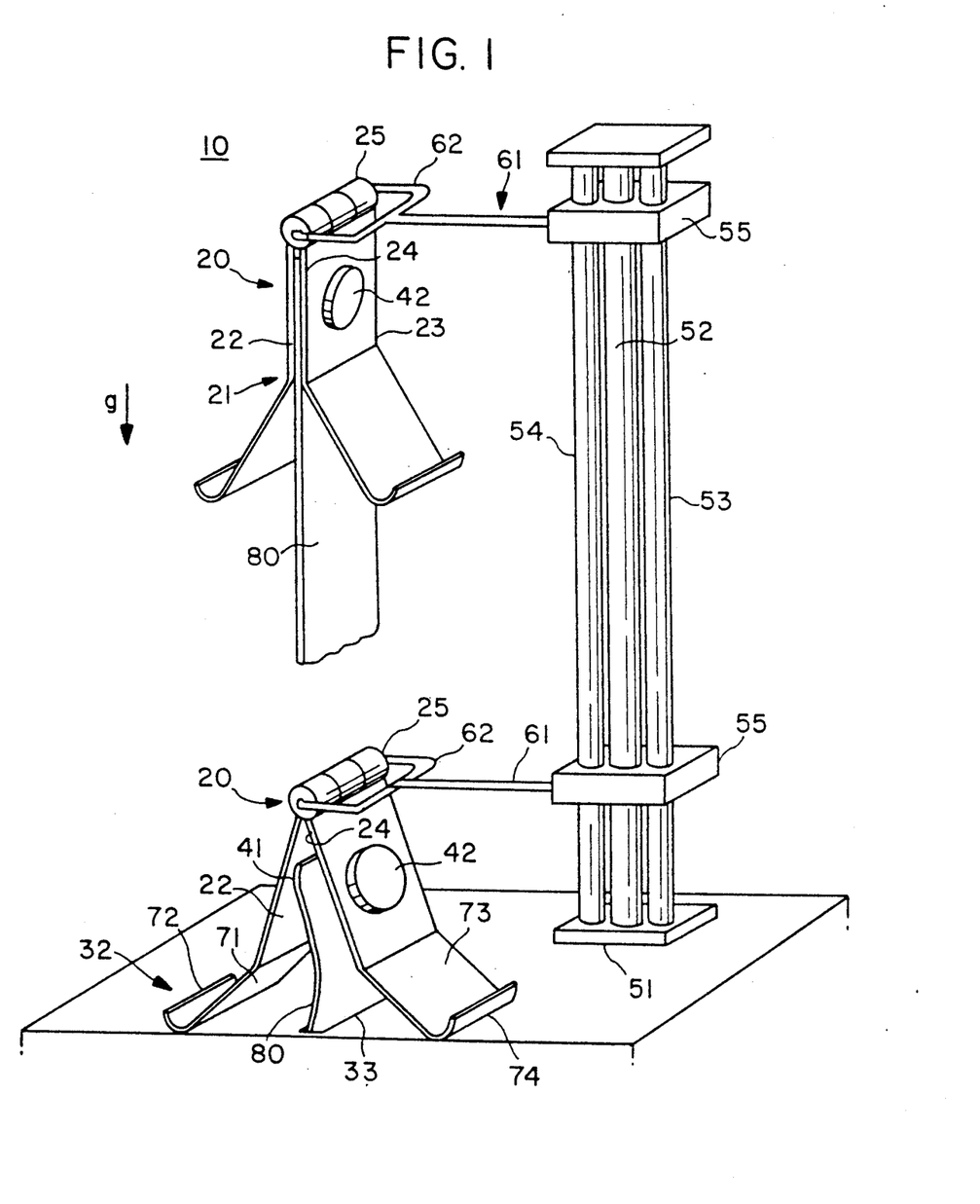
FIG. 1 is a perspective view of a first embodiment of a gripping and conveying apparatus according to the teachings of the present invention.

A first preferred embodiment of the apparatus for selectively gripping and conveying articles is shown in FIG. 1 and is represented generally by the numeral 10.

According to the present invention, the gripping and conveying apparatus includes at least one gripper including jaws having opposing surfaces for engaging an article. As embodied in FIG. 1, a gripper 20 is shown in an upper position where it is closed and a lower position where it is open. The gripper 20 comprises a first jaw 21 having a generally rectangular and generally flat first surface 22, and a second jaw 23, having a generally rectangular and generally flat second surface 24, opposed to first surface 22. First jaw 21 and second jaw 23 are disposed so that the first and second surfaces 22 and 24 define a generally vertical gripping plane.

Jaws 21 and 23 are rotatably joined together at one end by hinge means such as hinge 25, having a generally horizontal axis of rotation. Hinge 25 permits jaws 21 and 23 of gripper 20 to rotate between a closed position, shown in the upper portion of FIG. 1, and an open position, shown in the lower portion of FIG. 1. In the closed position, opposing surfaces 22 and 24 grip an article 80 and are relatively proximate one another. In the open position, surfaces 22 and 24 are spaced apart from each other to allow article 80 to be inserted between surfaces 22 and 24. In this embodiment, both jaws 21 and 23 are permitted to rotate.

According to the present invention, the gripping and conveying apparatus includes means for selectively separating the jaws. The separating means preferably includes cam means. As embodied in FIG. 1, the cam means comprises a generally horizontal planar cam surface 32, which may be positioned at a selected location to separate first and second jaws, 21 and 23, at that location. Cam surface 32 has a slot 33 through which articles may be dispensed.

According to the present invention, the gripping and conveying apparatus includes means for magnetically holding the jaws together to grip an article between the opposing surfaces. As embodied in FIG. 1, the holding means comprises a plurality of magnets 41 and 42 disposed in opposing surfaces, 22 and 24 of jaws 21 and 23. A single magnet may be positioned in a single jaw surface when the other jaws is composed of a material which can be attracted by a magnet. Magnets 41 and 42 can be selected to have a predetermined magnetic force, in order to hold first jaw 21 and second jaw 23 shut with predetermined holding force.

According to the present invention, the gripping and conveying apparatus further includes means for supporting and conveying the jaws and articles gripped between the opposing surfaces of the jaws. As embodied in FIG. 1, the supporting and conveying means includes a rigid metallic frame 51 to which cam surface 32 is attached, a rodless pneumatic cylinder 52, mounted to frame 51 to project vertically upward, generally parallel to the vertical gripping plane of first and second jaws 21 and 23 of gripper 20. An appropriate rodless cylinder is one such as Model NCDY1S25 manufactured by SMC Pneumatics of Japan. The conveying and supporting means also includes vertical guide columns 53 and 54 which orient a sleeve 55. Sleeve 55 is mounted to be driven up and down by rodless pneumatic cylinder 52.

As embodied in FIG. 1, a cantilevered support arm 61 extends from sleeve 55. The free end of arm 61 includes a clevis 62 which is attached to the pintle of hinge 25, allowing first and second jaws 21 and 23 both to depend downwardly and freely rotate relative to arm 61.

It is preferable, according to one aspect of the invention, that the supporting means supports the jaws in an orientation where the jaws are attracted together by gravity. As shown in FIG. 1, first jaw 21 and second jaw 23 depend generally downward from pintle of hinge 25. Due to this orientation, first jaw 21 and second jaw 23 are attracted together to a central position where they are proximate one another by the force of gravity "g". As jaws 21 and 23 approach more closely, due to the force of gravity, the magnetic force of magnets 41 and 42 becomes significant, and assists in drawing and holding jaws 21 and 23 together.

It is preferable, according to one aspect of the present invention, that the jaws include cam follower means, the separating means includes cam means at selected locations and the conveying means conveys the jaws relative to the cam means to separate the jaws by engaging the cam follower means with the cam means at the selected locations. As embodied in FIG. 1, the cam follower means includes generally rectangular first and second lower jaw extensions 71 and 73. First lower jaw extension 71, diverges at an angle from first jaw 21 and has a first leading edge 72. Second lower jaw extension 73, diverges at a preselected angle from second jaw 23, having a second leading edge 74. Leading edges 72 and 74 are curved to enhance sliding on cam surface 32. Alternately, the leading edges may include rollers (not shown in FIG. 1).

The embodiment shown in FIG. 1 operates in the following manner. First and second jaws 21 and 23, having first and second opposing surfaces 22 and 24 in a closed position, proximate one another, are moved vertically downward by pneumatic cylinder 52. At a preselected position, leading edges 72 and 74 of first and second lower jaw extensions 71 and 73 engage cam surface 32.

When this occurs, first and second lower jaw extensions are forced to diverge from each other, rotating jaws 21 and 23 about hinge 25, separating opposing surfaces 22 and 24 to open the jaws. An article to be gripped, for example a sheet of paper 80, may be transferred horizontally along cam surface 32 or may be dispensed upward through slot 33 and positioned between opposing surfaces 22 and 24 of open jaws 21 and 23.

Pneumatic cylinder 52 then reverses itself, lifting gripper 20 vertically upward. As lower jaw extensions 71 and 73 are moved away from cam surface 32, the force of gravity "g" causes first and second jaws 21 and 23 to rotate back and converge towards each other. As opposing surfaces 22 and 24 approach each other, the magnetic attraction of magnets 41 and 42 hold the jaws together, gripping article 80 therebetween. Article 80 can be conveyed by gripper 20 to the upper position shown in FIG. 1.

Figure 2:
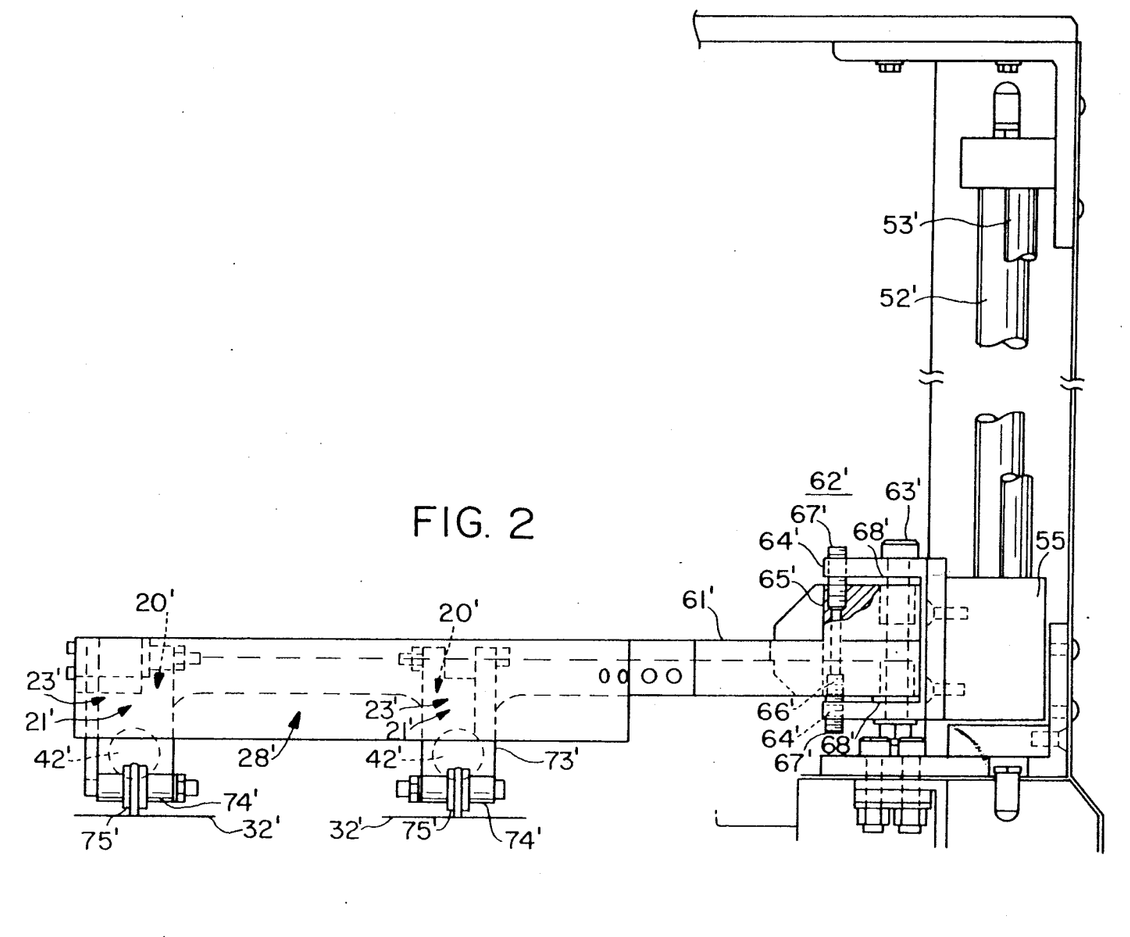
FIG. 2 is an end view of a second embodiment of a gripping and conveying apparatus according to the teachings of the present invention.
Figure 3:
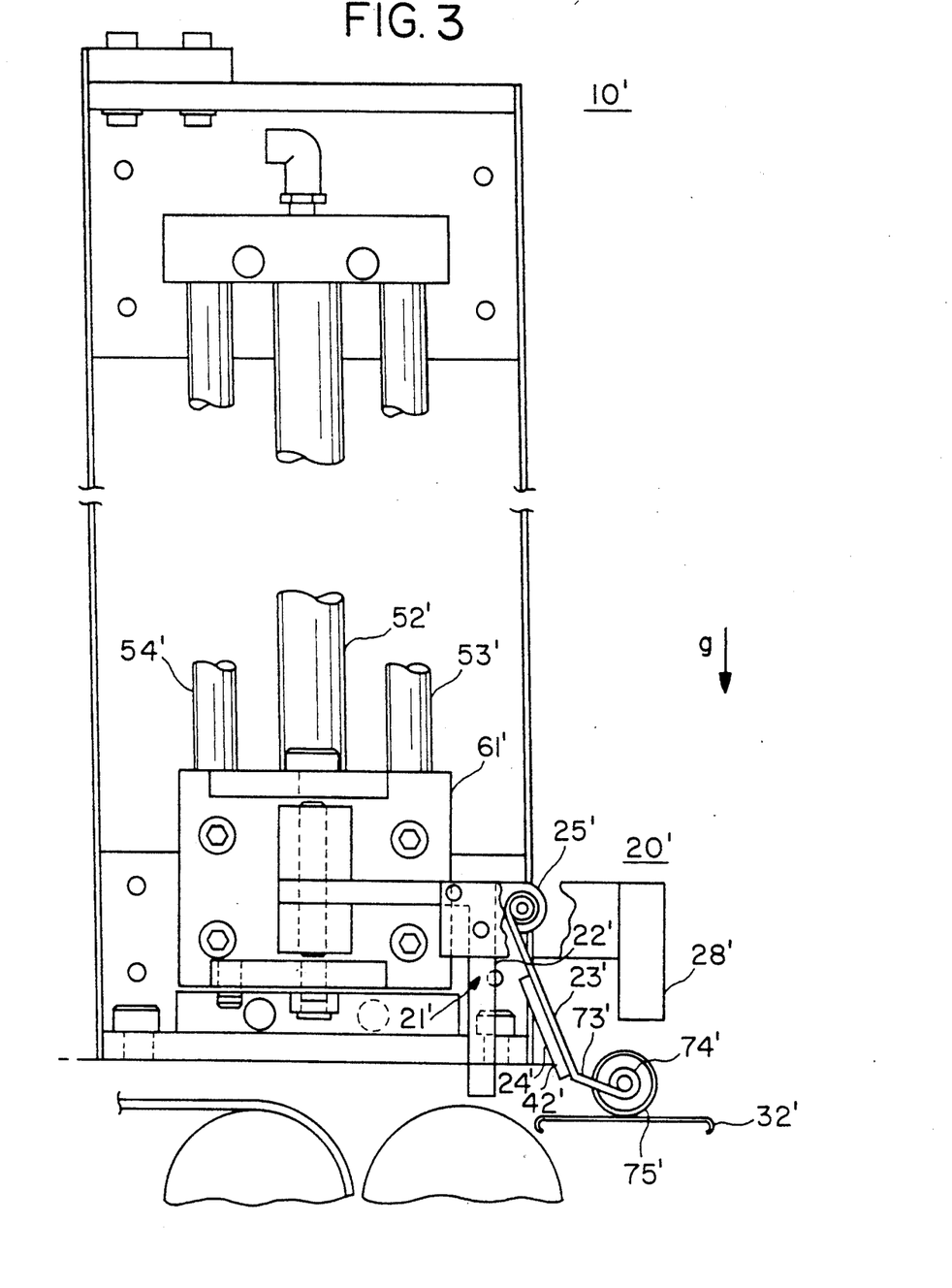
FIG. 3 is a side view of the embodiment shown in FIG. 2.
Figure 4:
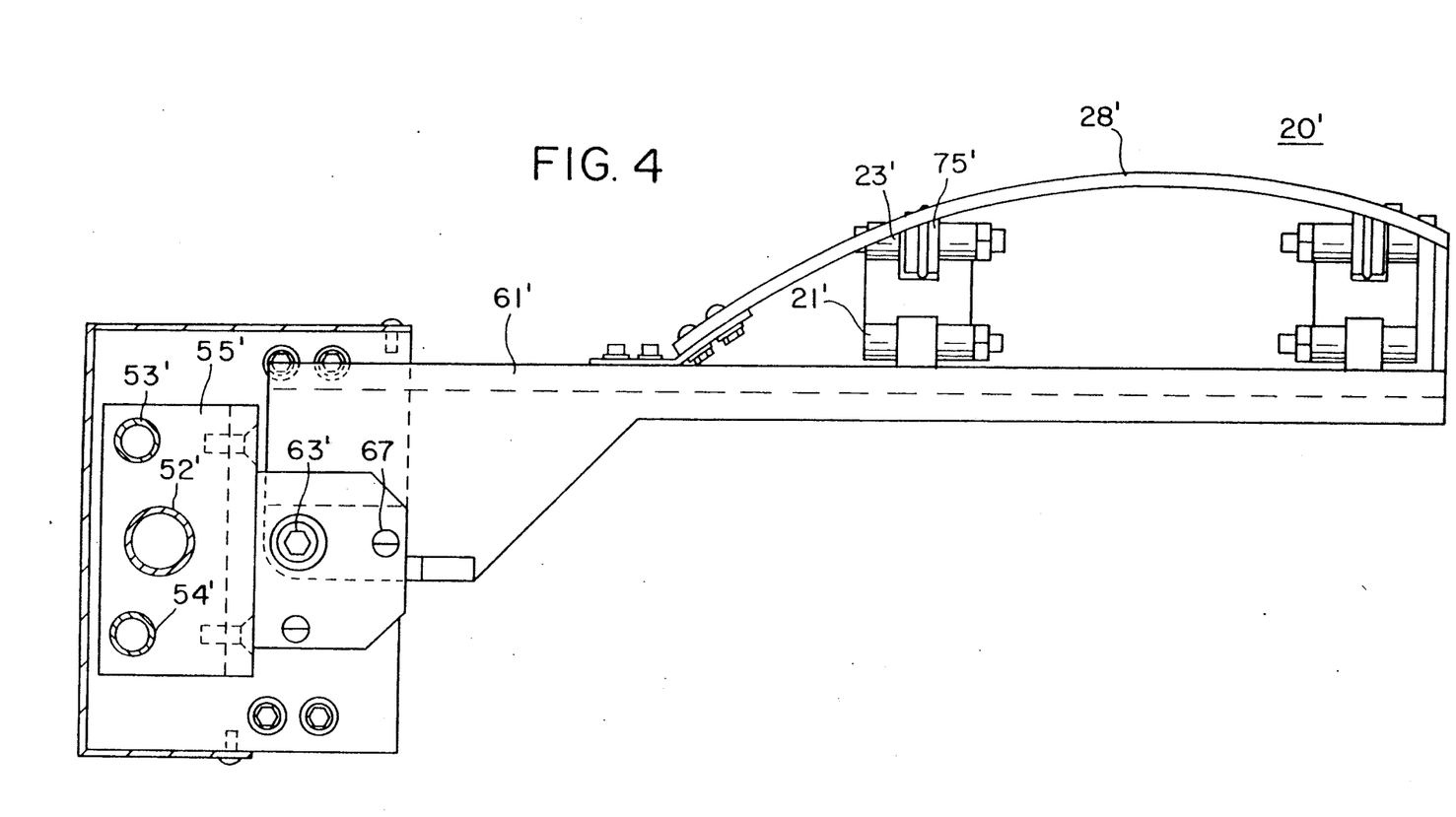
FIG. 4 is a top view of the embodiment shown in FIG. 2.

A second preferred embodiment of the apparatus for selectively gripping and conveying articles is shown in FIGS. 2, 3 and 4 and is represented generally by the numeral 10'.

According to the present invention, the gripping and conveying apparatus includes at least one gripper including jaws having opposing surfaces for engaging an article. As embodied in FIGS. 2-4, there are two grippers 20'. Each gripper 20' comprises a first jaw 21' having a generally rectangular and generally flat first surface 22', and a second jaw 23' having a generally rectangular and generally flat second surface 24', opposed to first surface 22'. First jaw 21' and second jaw 23' are disposed so that first and second surfaces 22' and 24' define a generally vertical gripping plane. Jaws 21' and 23' are joined together at one end by hinge means such as hinge 25', having a generally horizontal axis of rotation. Hinge 25' permits second jaw 23' of gripper 20' to rotate between a closed position (not shown) and an open position as shown in FIG. 3.

It is preferable, according to an aspect of the invention, that the first jaw is fixed to the supporting means and the second jaw hinges relative to the first jaw and the supporting means. As best shown in FIG. 3, first jaw 21' is non-rotatably fixed to arm 61' by bolts or other fasteners, and depends vertically downward from arm 61'. Second jaw 23' is rotatably attached to fixed first jaw 21' by hinge 25'.

Second jaw 23' has a lower jaw extension 73' from which a leading edge 74' diverges at a preselected angle. Leading edge 74' is configured with roller means such as a rotating wheel 75' which can roll on cam surface 32'. A protective bumper 28' is formed from a curved strip projecting away from arm 61' to substantially shield grippers 20' and protect outside objects from striking the jaws.

The second preferred embodiment operates substantially in the same manner as the first preferred embodiment, with the exception that only second jaw 23' rotates when rotating wheel 75' on leading edge 74' engages cam surface 32'. First jaw 21' is fixed relative to its support while second jaw 23' rotates away from first jaw 21', separating the jaws and opening gripper 20'.

It is preferable, according to an aspect of the invention to provide breakaway arm means for permitting the jaws to be displaced from their usual location when the jaws are encountered by a force greater than a preset value. As shown in FIG. 2, breakaway arm means includes a horizontally extending breakaway arm 61' and a breakaway attachment clevis 62' with vertical hinge pintle 63' which attaches an end of breakaway arm 61' to sleeve 55'. Breakaway attachment clevis 62' includes upper and lower spring loaded ball plungers 64' which engage depressions in upper and lower detent strike surfaces 65' and 66'. The amount of pressure exerted by the ball plungers, and thus the amount of resistance to rotation of breakaway arm 61' can be controlled by adjusting screws 67'. Bushings 68' act as bearings when breakaway arm 61' is rotated on hinge pintle 63'.

Breakaway arm 61' is capable of movement in two planes. During normal operation, breakaway arm 61' moves vertically up and down with sleeve 55' on pneumatic cylinder 52'. If encountered by a load which exerts a force greater than a preset value, breakaway arm 61' horizontally pivots on hinge pintle 63' to be clear of the operational area.

An apparatus incorporating the teachings of the present invention can be used to wrap bundles, such as bundles of newspaper, with a sheet of paper, commonly known in the art as a "three-way wrap bottomwrapper". An example of a three-way wrap bottomwrapper, employing the teachings of the present invention, is shown at FIGS. 5–8.

Figure 5:
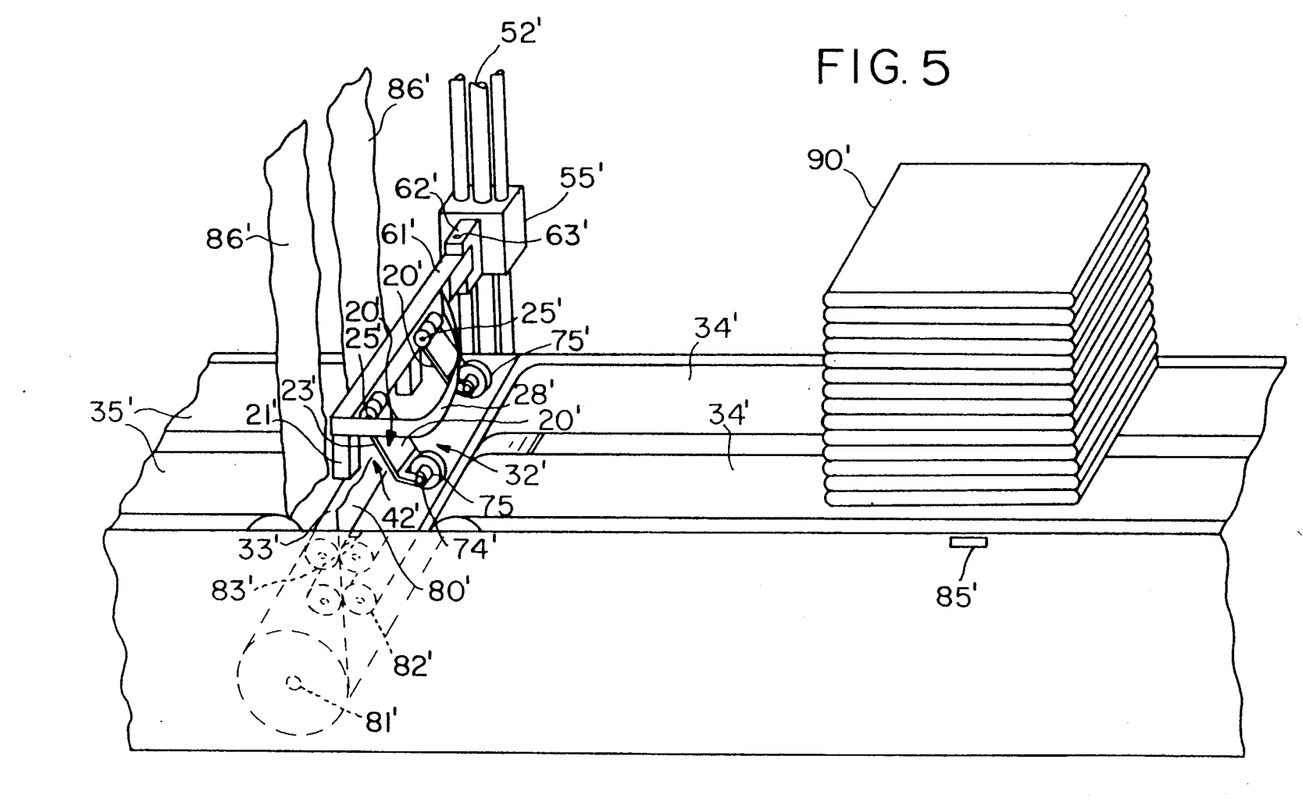
FIG. 5 is a perspective view of an apparatus for wrapping bundles, employing a gripping and conveying apparatus according to the teachings of the present invention showing a first operational step.

As shown in FIG. 5, a conveyor table is provided with planar cam surface 32', infeed conveyer belts 34', a slot 33' and outfeed conveyor belts 35'. Paper sheet 80' is fed upwards from a paper roll 81' through slot 33' by rollers of a paper feed mechanism 82', past a paper shear 83' (not shown in detail). Both paper feed mechanism 82' and paper shear 83' are located beneath the table proximate slot 33'. Vertically oriented hold-down curtains 86' are suspended above the table proximate grippers 20'.

The three-way wrap bottomwrapper, employing the teachings of the present invention, operates in the following manner. As shown in FIG. 5, a bundle of newspapers 90' is placed on infeed conveyer belts 34', which conveys the bundle 90' in the direction of a wrapping station near pair of gripper 20'. First and second jaws 21' and 23' of grippers 20', having first and second opposing surfaces 22' and 24' in a closed position, proximate one another, are moved vertically downward by pneumatic cylinder 52'. Rotating wheels 75' on leading edges 74' of second jaws 23' engage cam surface 32' on the conveyer table, and second jaws 23' are forced to diverge from first jaws 21', rotating about hinge pintles 25' to an open position above slot 33'.

Simultaneously with the above operation, bundle 90', proceeding toward the wrapping station, passes proximity sensor 85', which generates a signal to activate paper feed mechanism 82'. Paper sheet 80' is thus fed through slot 33' to be between open first and second jaws 21' and 23'.

Figure 6:
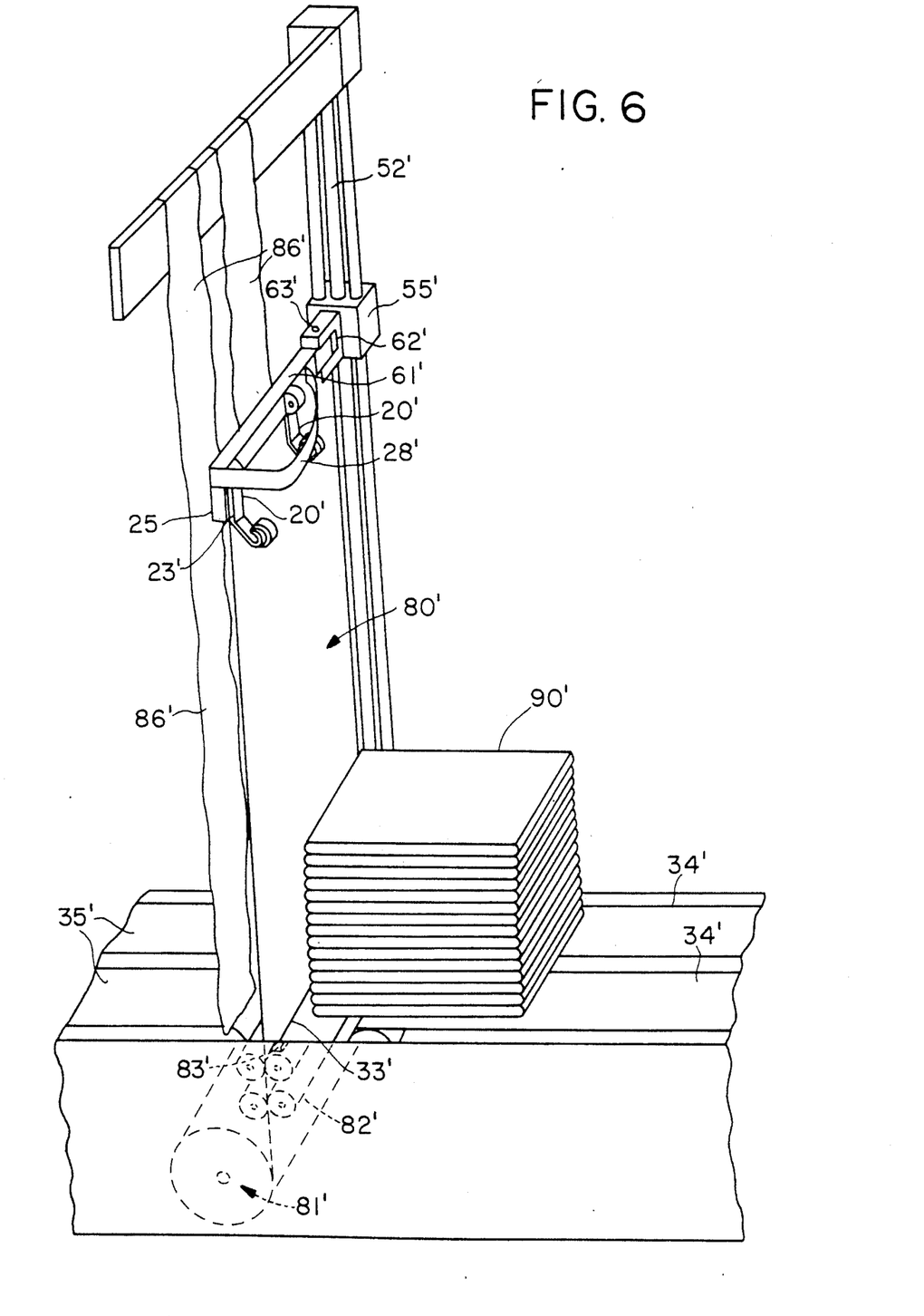
FIG. 6 is a perspective view of the apparatus of FIG. 5 showing an intermediate operational step.

As shown by the progression between FIGS. 5 and 6, bundle 90' continues toward the wrapping station on conveyer belts 34', as first and second jaws 21' and 23' are moved vertically upward by pneumatic cylinder 52'. Under the force of gravity "g", second jaws 23' slowly move in the direction of vertically depending fixed jaws 21'. When second jaw leading edges 74' and rotating wheels 75' are free of planar cam surface table 32', first and second jaws 21' and 23' are generally vertical, generally proximate one another. Opposing surfaces 22' and 24' are attracted together and held with a predetermined magnetic force by magnets 41' and 42' disposed therein. Paper sheet 80' is thus gripped between surfaces 22' and 24'. As discussed above, it is also possible, in certain application to use a magnet in one jaw when the other jaw is composed of a material which can be attracted by a magnet. For example, a first jaw 21' may contain a magnet and second jaw 23' may be composed of material which can be attracted by a magnet. As first and second jaws 21' and 23' continue their upward ascent, paper sheet 80' continues to be fed upward, guided by gripper 20' into vertical disposition, generally transverse the direction of travel of bundle 90'.

As shown in FIG. 6, bundle 90' reaches the wrapping station when first and second jaws 21' and 23' reach their upper position. Bundle 90' contacts paper sheet 80' and continues being conveyed past grippers 20', so that paper sheet 80' is pulled taut and wraps about a top leading edge of bundle 90'.

Figure 7:
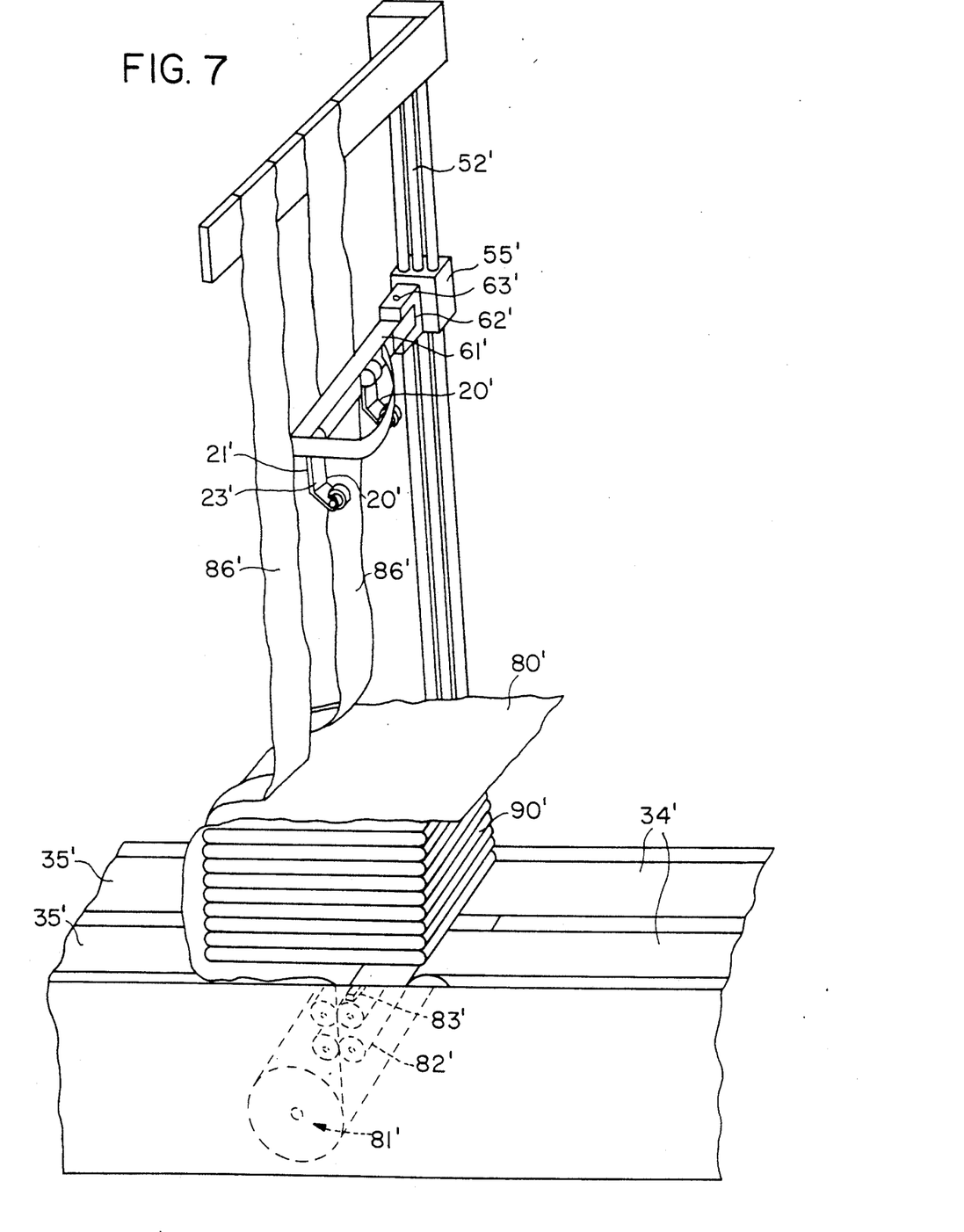
FIG. 7 is a perspective view of the apparatus of FIG. 5 showing a final operational step.

As shown in the progression between FIGS. 6 and 7, when tension in paper sheet 80' exceeds the capability of first and second jaws 21' and 23', paper sheet 80' pulls out of grippers 20' and settles over the top of bundle 90'. As the bundle 90' clears slot 33', paper shear 83' cuts sheet 80' below the conveyer table. Vertical hold-down curtains 86' contact the top of bundle 90', holding paper sheet 80' to bundle 90'. Bundle 90' with paper sheet 80' may now be strapped together and conveyed out of the wrapping station by outfeed conveyors 35'. Meanwhile, pneumatic cylinder 52' lowers jaws 21' and 23' to conveyer table cam surface 32' in order to open them as described above, so that a succeeding paper sheet may be gripped and elevated when a succeeding bundle is placed on the conveyor belt.

Figure 8:
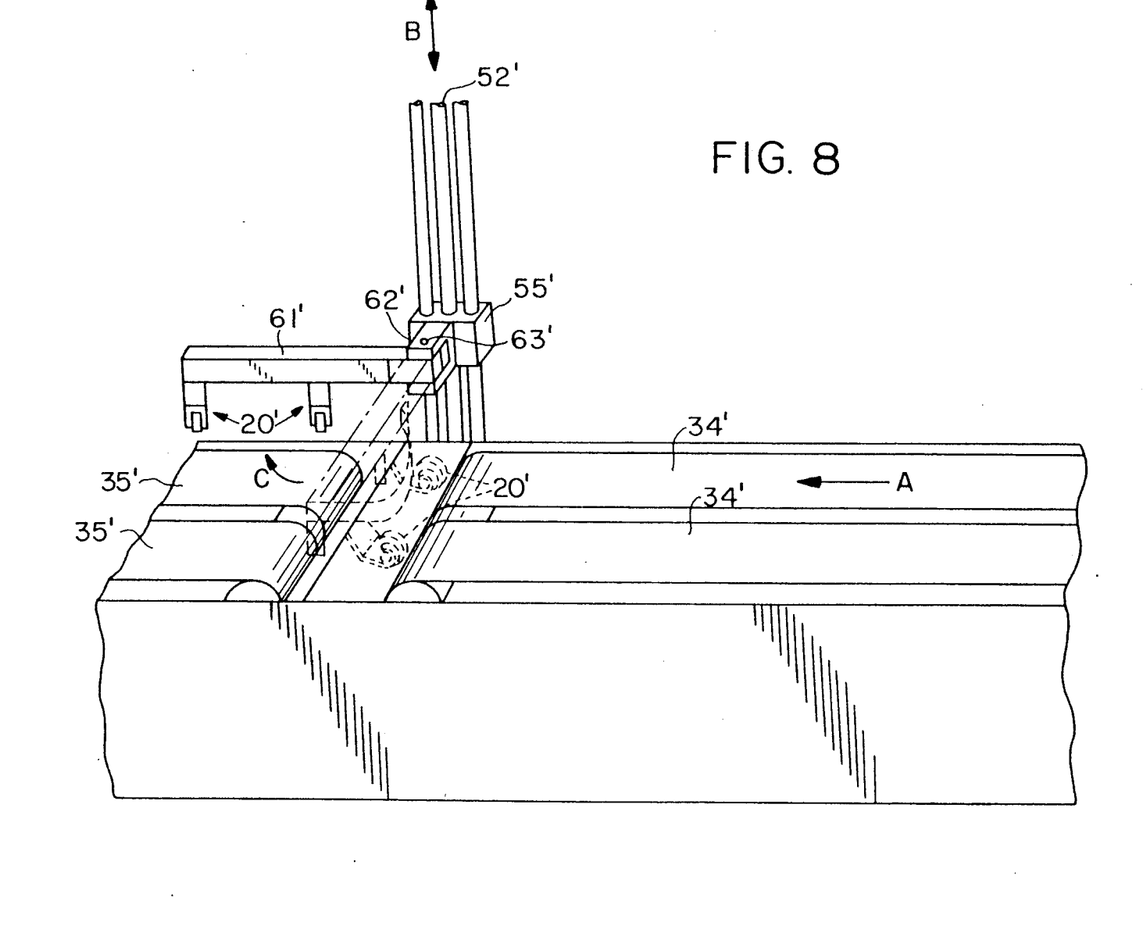
FIG. 8 is a perspective view of the apparatus of FIG. 5 with its breakaway arm displaced.

As shown in FIG. 8, during normal operation, bundles 90' or other loads are transported along a horizontal first path A by conveyor belts 34' and 35' through a wrapping station where grippers 20' are conveyed along a vertical second path B. Path B has an intersection with first path A at the wrapping station. Should a bundle 90' improperly enter the intersection and be improperly fed against breakaway arm 61' when breakaway arm 61' is in its lower position at the intersection of paths A and B, breakaway arm 61' will pivot on hinge pintle 63' and rotate along arcuate horizontal third path C from the broken line position to the solid line position, swinging clear of the intersection and preventing any potential damage to grippers 20' and breakaway arm 61'. The details of a presently preferred breakaway arm mechanism are discussed above. However, other arrangements are also possible. Breakaway arm 61' may be returned to its normal operating position after bundle 90' is removed from the wrapping area.

Figure 9:
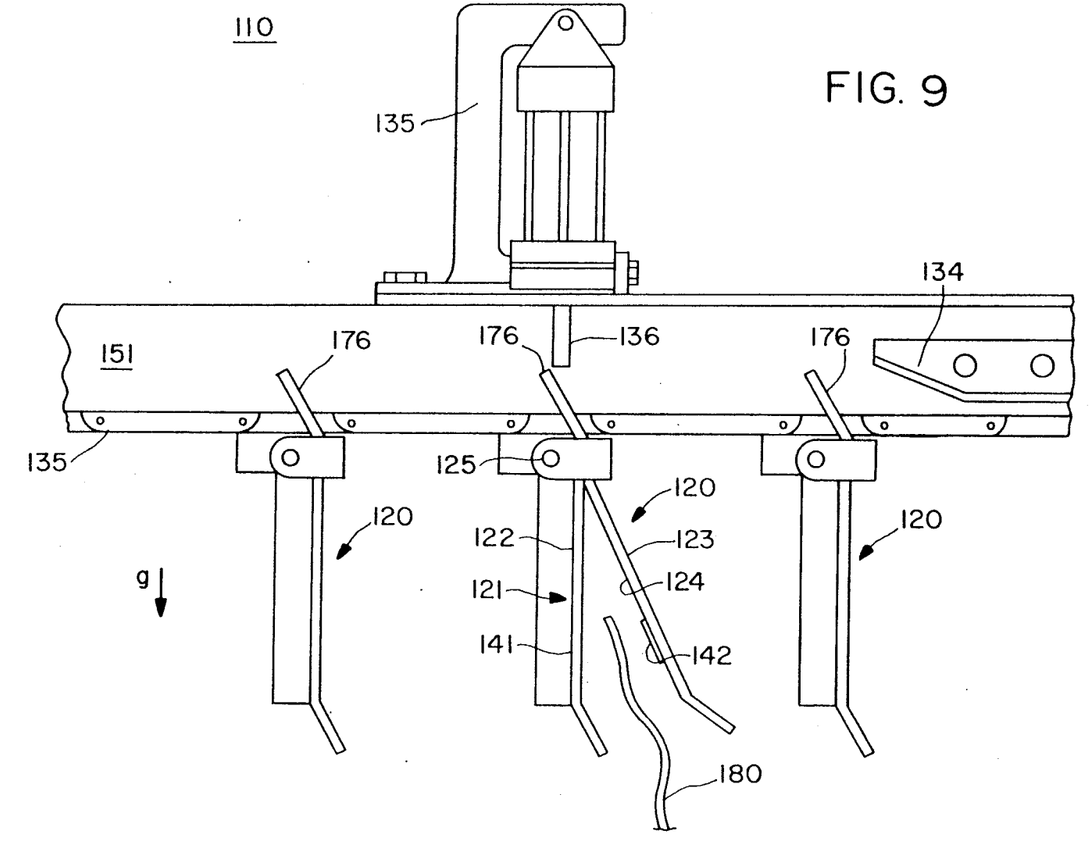
FIG. 9 is a side view showing a third embodiment of a gripping and conveying apparatus according to the present invention.

A third preferred embodiment of the present invention is shown in FIG. 9 and is represented generally by the numeral 110. A plurality of grippers 120 each have a first jaw 121 having a generally rectangular generally flat first surface 122, and a second jaw 123 having a generally rectangular generally flat second surface 124, opposed to first surface 122. Jaws 121 and 123 are rotatably joined together with hinge 125, and are mounted to a conveyor mechanism such as chain 155 for horizontal motion on metallic supporting frame 151. First and second surfaces 122 and 124 respectively, are disposed generally proximate one another to define a gripping plane in a vertical alignment, so that the force of gravity "g" attracts them toward one another. The grippers include cam follower means which diverge at a preselected angle from said gripping plane. As shown in FIG. 9, the cam follower means includes rectangular second jaw upper extension 176 which is an integral part of second jaw 123. The middle gripper 120 is shown both in an open and a closed position.

Opposing the horizontal movement of the plurality of grippers 120 are cam means such as a projecting fixed cam plate 134, which may be positioned at a selected location to engage and rotate upper extension 176 in order to separate first and second jaws, 121 and 123.

A pneumatic actuator 135 is rigidly mounted to frame 151, above chain 155. Pneumatic actuator 135 includes a reciprocating piston 136 for selectively engaging and rotating second jaw upper extension 176.

The embodiment shown in FIG. 9 operates in the following manner. Grippers 120, each having first and second jaws 121 and 123, with first and second opposing surfaces 122 and 124 proximate one another in the gripping plane defined thereby, are moved horizontally by chain 155 from left to right as shown in FIG. 9. When a gripper 120 reaches the selected location of fixed cam 134, its second jaw upper extension 176 engages fixed cam 134, rotating second jaw 123 on hinge 125, separating the surfaces 122 and 124 and opening the jaws. An article 180 can be inserted between open jaws 121 and 123. As conveyor belt 155 moves that gripper 120 past fixed cam 134, second jaw upper extension 176 disengages from fixed cam 134, and the force of gravity "g" rotates second jaw 123 back towards first jaw 121. As first and second opposing surfaces, 122 and 124 come proximate one another, the magnetic attraction of magnets 141 and 142 hold the jaws shut, gripping article 180 therebetween. When article 180 is conveyed to its selected destination it may be pulled from the jaws or the jaws may be opened by a cam mechanism.

First and second jaws 121 and 123 may also be opened by the action of pneumatic actuator 135. At a selected time, when a selected gripper 120 approaches a point where pneumatic actuator 135 is mounted, such as the position of middle gripper 120, reciprocating piston 136 is lowered to engage second jaw upper extension 176, thereby forcing the jaws apart. The remainder of the operation is substantially as described above.

Pneumatic actuator 135 offers the flexibility of being able to selectively open gripper 120 at the position where actuator 135 is located, or allow gripper 120 to remain closed when it passes the position where actuator 135 is located. In contrast, fixed cam 134 will always open gripper 120 when gripper 120 passes the location of fixed cam 134.

In accordance with the invention the use of magnets disposed in the opposing surfaces of the jaws to provide the holding force for the jaws, rather than using springs and mechanical actuators as in the prior art, produces multiple advantages. First, the attractive force of the magnets is maximal while the jaws are closed, rather than when they are open. Further, the disposition of the jaws, which allows the force of gravity "g" to attract them toward one another, plus the reduction in the number of mechanical parts, reduces the amount of mechanical fatigue, maintenance down time, and lifetime cost of the gripping and conveying apparatus.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the applicants' general inventive concept.

What is claimed is:

1. An apparatus for selectively gripping and conveying articles comprising:

first and second jaws having opposing surfaces for engaging an article, and means for hinging the second jaw relative to the first jaw;

means for magnetically holding the jaws together to grip an article between the opposing surfaces;

means for supporting and conveying the jaws and articles gripped between the opposing surfaces of the jaws, the first jaw being fixed to the supporting means and the second jaw oriented to be attracted in the direction of the first jaw by gravity, the opposing surfaces of the jaws generally defining a vertical gripping plane when the opposing surfaces are together and the hinging means having a horizontal axis of rotation from which the opposing surfaces depend downwardly; and means for selectively separating the jaws including cam follower means on the second jaw which diverges from the gripping plane and cam means the conveying means conveying the jaws generally vertically and relative to the cam means to separate the jaws by engaging the cam follower means with the cam means.

2. The apparatus of claim 1 wherein at least one end of the second jaw diverges from the gripping plane to define the cam follower means.

3. The apparatus of claim 1 wherein the leading end of the second jaw diverges from the gripping plane to define the cam follower means.

4. The apparatus of claim 3 wherein the conveying means conveys the jaws generally in gripping plane to separate the opposing surfaces by engaging the cam follower means and the cam means.

5. The apparatus of claim 4 wherein the cam follower means includes roller means for rolling along the cam means.

6. The apparatus of claim 1 wherein the supporting and conveying means includes a frame and fluid cylinder means connected between the frame and the jaws for conveying the jaws relative to the frame.

7. The apparatus of claim 1 wherein the cam means is controllably positionable to selectably prevent and permit the cam means to engage the cam follower means.

8. An apparatus for selectively gripping and conveying articles comprising;

at least one gripper including jaws having opposing surfaces for engaging an article;

means for selectively separating the jaws;

means for mechanically holding the jaws together to grip an article between the opposing surfaces; and means for supporting and conveying the jaws and articles gripped between the opposing surfaces of the jaws, including breakaway arm means for permitting the jaws to be displaced from their usual location when the supporting means is encountered by a force greater than a preset value.

9. The apparatus of claim 8, wherein the breakaway arm means permits the jaws to be displaced in a generally horizontal direction at times when the supporting means encounter the force greater than the preset value.

10. The apparatus of claim 8, wherein the breakaway arm means include detect means for preventing displacement of said jaws unless encountered by the force greater than the preset value.

* * * * *